United States Patent [19]
Lange

[11] 3,822,052
[45] July 2, 1974

[54] SHUT OFF CLAMP
[75] Inventor: Carl W. Lange, Des Plaines, Ill.
[73] Assignee: Illinois Tool Works Inc., Chicago, Ill.
[22] Filed: Apr. 2, 1973
[21] Appl. No.: 347,006

[52] U.S. Cl. .............................. 251/10, 24/255 SL
[51] Int. Cl. ............................................ F16k 7/04
[58] Field of Search... 128/346; 24/248 BB, 255 SL, 24/255 TZ; 25/4, 9, 10

[56] References Cited
UNITED STATES PATENTS
| | | | |
|---|---|---|---|
| 823,068 | 6/1906 | Mosley | 251/10 |
| 827,640 | 7/1906 | Jessup | 251/10 |
| 1,361,770 | 12/1920 | O'Connor | 251/10 |
| 3,698,043 | 10/1972 | Batts | 24/255 SL X |
| 3,713,622 | 1/1973 | Dinger | 251/10 |

Primary Examiner—William R. Cline
Assistant Examiner—Richard Gerard
Attorney, Agent, or Firm—J. R. Halvorsen; R. W. Beart

[57] ABSTRACT

A clamp for one-hand manipulation in controlling the flow of fluid through flexible tubing, such as intravenous tubing systems, and formed from a molded flat strip of plastic material configured to provide hinge areas for bending the strip to provide a base with an overlying lever arm between which the tubing is disposed, and a slotted locking arm upstanding from the base and having notches to receive a locking head on the lever arm for cooperation with the notches to hold abutment surfaces on the lever arm and base in position for clamping the tubing therebetween in completely or partially constricted position, and with permissible finger manipulation causing relative movement between the lever and locking arms to effect quick release of the interengaged head and notches, respectively.

8 Claims, 11 Drawing Figures

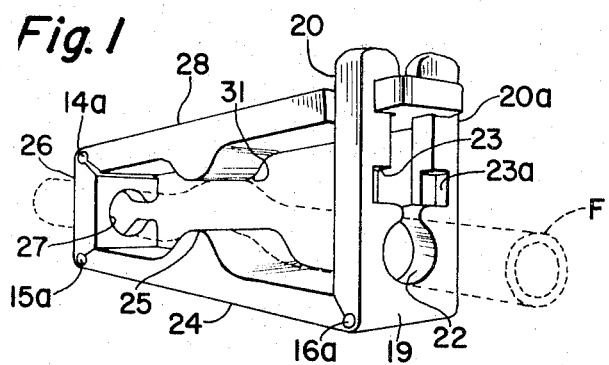
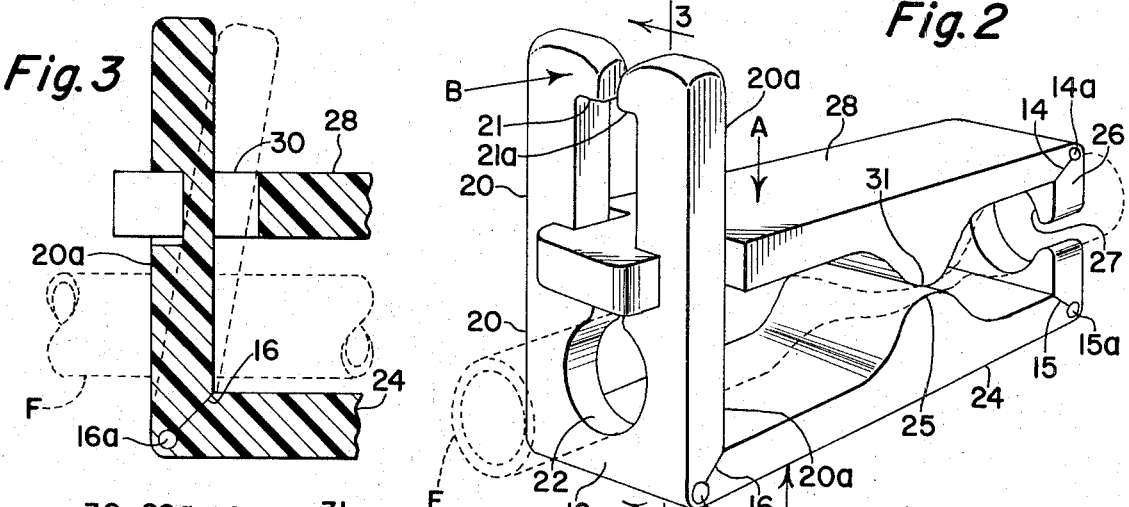
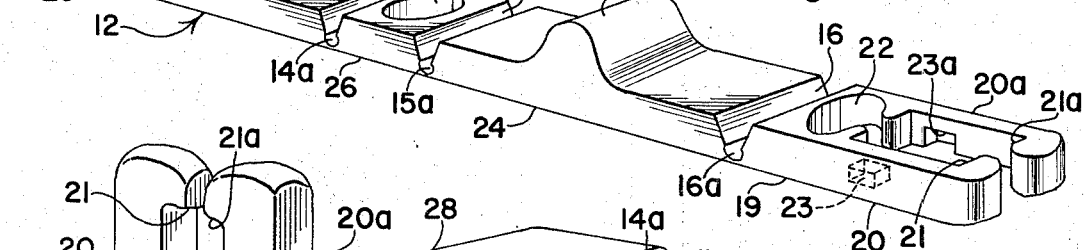
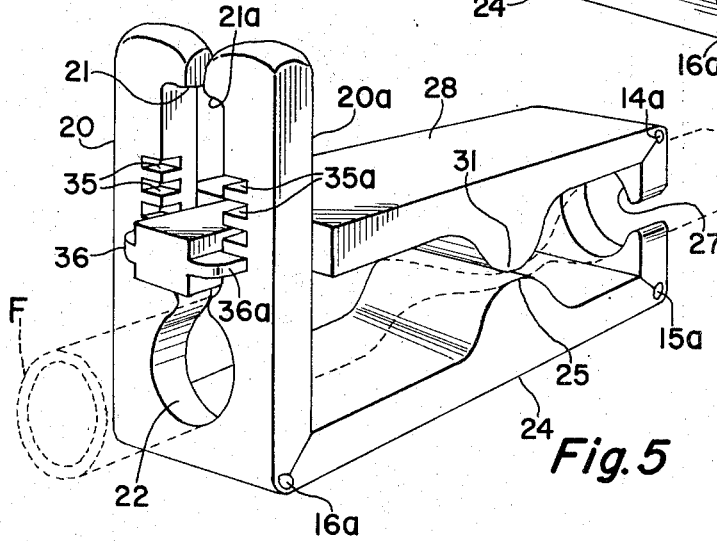

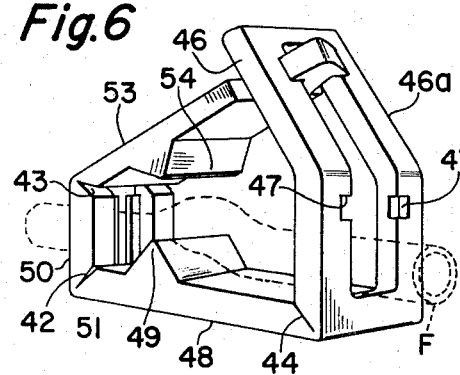
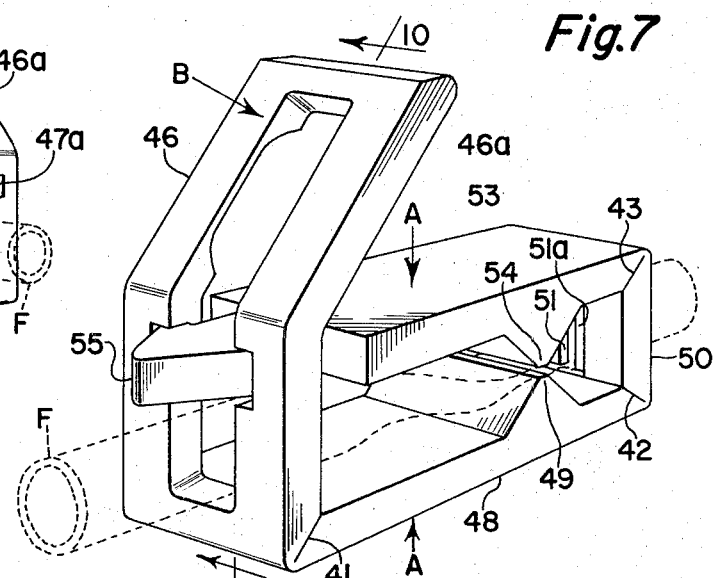
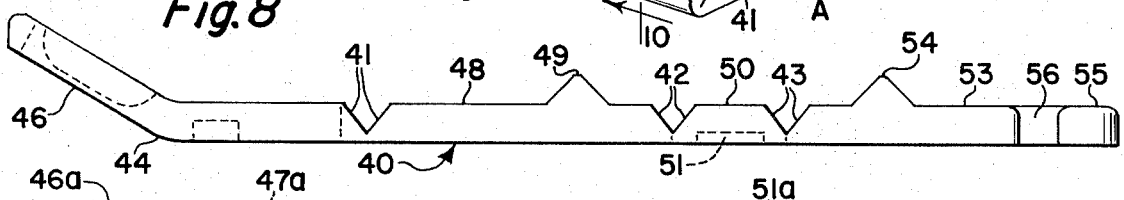
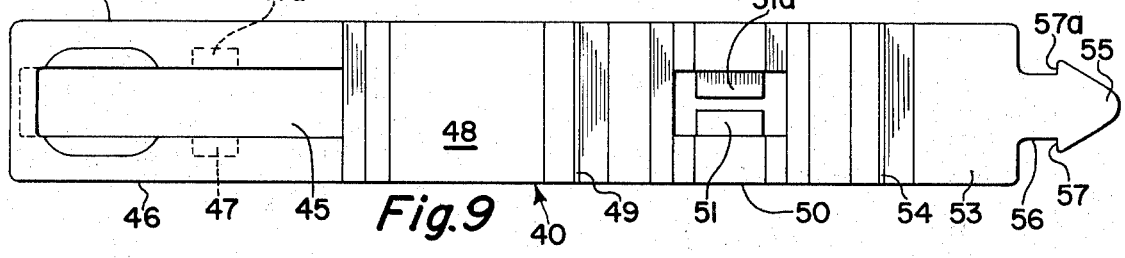
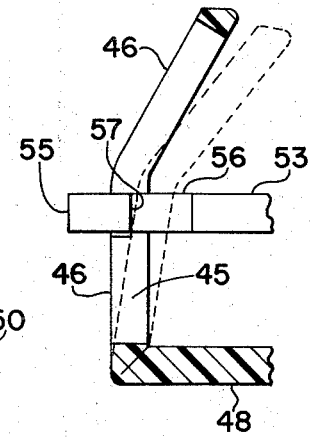
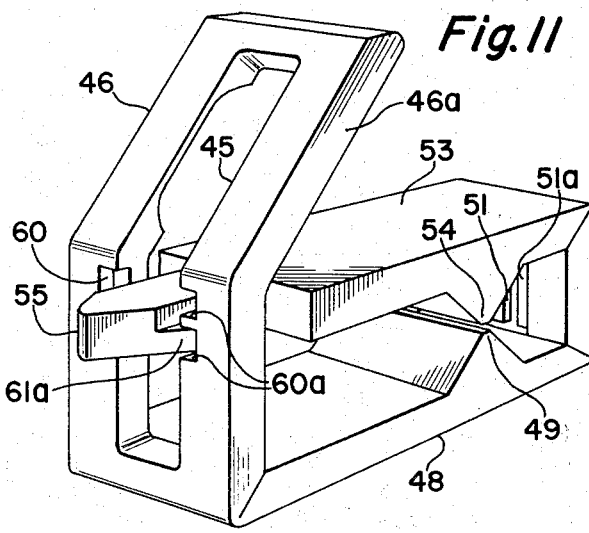

SHUT OFF CLAMP

This invention is concerned with one-hand finger manipulation of a clamp for controlling fluid flow through a flexible tube such as, for example, for use with an intravenous tubing system in transferring fluids to or from a recipient or donor body.

In many known tube clamping arrangements, there is a squeezing action between intermediate surfaces of connected lever arms and there are also tube clamping arrangements with wedging surfaces rotatable or slidable into tube constricting positions. These tube clamping arrangements also include some form of locking means for holding the clamping surfaces in tube constricting configuration for stopping or selectively metering the flow of fluid therethrough. It is usually a simple operation to bring the locking means into engagement. However, it is sometimes relatively more difficult and time-consuming to release the locking means and the tube from constricting configuration for free flow of fluid or for separating the clamp and tubing.

An object of the present invention is to provide a tube clamp enabling one-hand finger manipulation thereof for rapid clamping and release of the tubing with minimum movement thereof for comfort of the recipient or donor body.

Another object of the invention is to provide such a tube clamp from a substantially flat and relatively rigid plastic strip transversely contoured at spaced intervals to provide spring hinge and abutment areas along which the strip is folded to provide a base with an upstanding end from which a lever arm extends to overlie the base and engage a locking arm upstanding from the other end of the base.

The above and other objects of the invention will, in part, be obvious and will be hereinafter more fully pointed out in the detail description of the drawings in which:

FIG. 1 is a perspective view of the clamp in released position relative to the tubing;

FIG. 2 is a perspective view of the clamp in clamping position relative to the tubing;

FIG. 3 is a sectional view along the line 3—3 of FIG. 2;

FIG. 4 is a perspective view of the flat molded strip which is bent to provide the clamp of FIGS. 1 and 2;

FIG. 5 is a perspective view similar to FIG. 2 but showing a modification for adjustable constriction of the tubing;

FIG. 6 is a perspective view similar to FIG. 1 but showing a slightly modified clamp;

FIG. 7 is a perspective view of the clamp of FIG. 6 in tube clamping position;

FIGS. 8 and 9 are side and plan views, respectively, of the molded strip which is bent to provide the clamp of FIG. 6;

FIG. 10 is a sectional view along the line 10-10 of FIG. 7; and

FIG. 11 is a perspective view similar to FIG. 7 but showing a modification for adjustable constriction of the tubing.

With reference to FIG. 4, there is shown a molded strip 12 of plastic material, such as polypropylene, of substantial stiffness between weakened areas provided by V-shaped notches presenting abutable chamfered surfaces 14, 15, 16 with rounded apical portions 14a, 15a, 16a, respectively, which provide hinge areas along which the strip is bent to the position of FIG. 1. Thus, the strip provides, between the notches, a front upstanding section 19 providing spaced arms 20, 20a with inturned spaced abutments 21, 21a at the free ends thereof and an upwardly open tube receiving opening 22 at the bottom thereof adjacent the notch 16 and opposed locking recesses 23, 23a; a base 24 with a tube clamping abutment 25; an upstanding rear end section 26 with a laterally open tube receiving opening 27; and a lever arm 28 with T-shaped head presenting lateral abutments 29, 29a at the end of shank 30 and overlying the base to present a tube clamping abutment 31 in opposition to the abutment 25 on the base 24. In folding the plastic strip to the operative position of the clamp, the T-head and shank portion 30 of the arm 28 are forced through the open end of the front section 19, thus causing slight separation of the arms 20, 20a which then snap back into engagement with the shank portion. While the material is relatively stiff, this separation of the arms is permitted by the reduced cross-section thereof at opposite sides of the tube receiving opening 22.

In the operative position of the clamp, the chamfered sides of the notches 14, 15, 16 present bearing or abutment surfaces and the reduced thickness of the strip material at the corners of the rounded apical portions 14a, 15a, 16a is stressed in tension due to the bending or folding of the strip. In the released position of the clamp, as in FIG. 1, the flexible tubing F may be threaded through the openings 22, 27 or sidewise inserted through the access slots to these openings, and the clamp located at the desired position for transmission of fluid therethrough. When it is desired to cut off the flow of fluid, the arm 28 and base 24 are pressed together by finger pressure thereon as indicated by the arrows A in FIG. 2. This will constrict and close the tubing between the abutments 25, 31 and cause a bending of the arms 20, 20a under influence of the shoulders 29, 29a riding thereover and ultimate snapping of these shoulders into the locking recesses 23, 23a, respectively, at which time the arms 20, 20a will return from the dotted line bent position of FIG. 3 to the full line locked position as also shown in FIG. 2. While the material of the clamp is relatively stiff and rigid between the hinge and abutment areas 14, 15, 16, it has sufficient resiliency along the narrow arms 20, 20a to permit this bending which also compresses the material at the abutment surfaces 16 with some stretching of the material at the corner portion 16a. The length of the lever arm 28 and the relative locations of the locking recesses 23, 23a and the shoulders 29, 29a are controlled within tolerances such that the section 19 with its arms 20, 20a has a hinge as well as a bearing surface along the chamfered abutting surfaces at 16, thus providing a combined spring effect at that corner and constrained bending of the arms. To release the tubing for fluid flow therethrough, the arms 20, 20a are gripped and pressed rearwardly in the direction of the arrow B in FIG. 2 and to the dotted line position shown in FIG. 3. The length of the shank portion 30 is selected for this permissive movement to remove the locking recesses 23, 23a from engagement with the shoulders 29, 29a and permit the latter to move upwardly with the arm 28 to the released position of FIG. 1 into engagement with the lugs or abutments 21, 21a. This movement to released position is automatic in that the clamping position of the arm 28 stresses the same and compresses the material along the abutting corner surfaces 14 as well as stretching the material at the corner 14a with the result that this stored energy restores the arm upwardly to released position upon disengagement of the shoulders 29, 29a and recesses 23, 23a and with slight separation of the surfaces 14.

A modified clamp is shown in FIGS. 6 and 7 formed from the molded plastic strip of FIGS. 8 and 9. The molded plastic strip 40 is provided with spaced V-shaped notches presenting chamfered edges 41, 42, 43 dividing the strip into a front upstanding section 44 having a central closed aperture 45 between arms 46, 46a with the upper portions inclined rearwardly and with locking recesses 47, 47a, respectively, below the inclined portions; a base section 48 with a tube clamping abutment 49; an upstanding rear section 50 with thin flexible leaves or flaps 51, 51a extending partially across the tube receiving aperture therethrough; and a lever arm 53 overlying the base and presenting a tube clamping abutment 54 in opposition to the abutment 49 on the base and terminating in a T-shaped head 55 provided with a shank 56 and shoulders or abutments 57, 57a to cooperate with the recesses 47, 47a, respectively, on the front section as will be pointed out below. In folding the plastic strip 40 to the position of FIG. 6, the head 55 of the arm 53 is forced through the aperture 45 spreading the arms 46, 46a which then snap back into engagement with the shank 56 with the shoulders 57, 57a overlying the outer surfaces of the arms. The inclined sides 41, 42, 43 of the V-shaped notches present bearing or abutment surfaces and the reduced thickness of the material at the apices provide hinge sections stressed in tension on folding of the strip.

In the released position of the clamp in FIG. 6, the tubing F is passed through the aperture 45 below the notches 47, 47a and is forced between the leaves or flaps 51, 51a spreading the same to remain in contact with the tubing but the flexibility of the flaps is such that the tubing is not constricted thereby. However, the grip of the flaps on the tubing is sufficient to maintain the clamp in desired position as when the tubing is in vertical position with the clamp disposed along a vertical extent thereof. In this released position of the clamp, the inclined edges 43, 42 are slightly separated. To cut off the flow of fluid through the tubing, the arm 53 and base 48 are pressed together in the direction of the arrows A in FIG. 7 to close the tubing between the abutments 49, 54. During this closing movement, the arms 46, 46a will be stressed to the dotted line position of FIG. 10 until the shoulders 57, 57a align with the locking recesses 47, 47a, respectively, at which time the arms will snap back to the full line position. In this tube closing position of the clamp, the chamfered surfaces 41, 42, 43 will be maintained in mutually abutting relationship with the hinge corners stressed, as well as the arms 46, 46a and the lever arm 53. Here again, this stressed relationship is provided by controlling the length of the arm 53 and the relative locations of the locking recesses and shoulders resulting in a combined spring effect and abutment surfaces at the hinge corners. To release the tubing for fluid flow, the front section 46 is pressed rearwardly in the direction of the arrow B in FIG. 7 to the dotted line position of FIG. 10, the length of the shank 56 permitting this movement to remove the locking recess 47, 47a from engagement with the shoulders or lugs 57, 57a. Under the stressed conditions at the abutting surfaces 42, 43, the front section will automatically return to the position of FIG. 6, thus separating the tube clamping abutments 49, 54.

For varying the amount of constriction of the tubing and thus controlling the flow therethrough, the clamp of FIG. 1 may be modified as in FIG. 5 and the clamp of FIG. 6 may be modified as in FIG. 11. Thus, in FIG. 5, the arms 20, 20a are modified to include a plurality of locking recesses 35, 35a along the lengths thereof to selectively receive similarly shaped lugs 36, 36a on the head of the arm 28 and thus vary the spacing between the tube clamping abutments 31, 25. The operation of the clamp for this purpose is as previously described. Likewise, in FIG. 11, plural locking recesses 60, 60a are provided on the arms 47, 47a, respectively, for selective cooperation with narrower lugs 61, 61a on the head 55 of the arm 53. Here again, the operation of the front section 46 is as previously described for positioning the lugs 61, 61a selectively in the recesses 60, 60a.

I claim:

1. A clamp for controlling fluid flow through a flexible tube; and comprising a molded strip of plastic material having spaced transverse substantially V-shaped notches providing inclined abutment surfaces with apical relatively thin hinge connections about which the strip is folded to provide a base section with a tube clamping lower abutment, an upstanding front section having laterally spaced substantially vertical arms between which the tube is to be disposed to overlie the lower abutment and having confronting locking recesses, an upstanding rear section with an aperture to receive the tube therethrough, and a lever arm section extending forwardly from the rear section to overlie the base section and having a tube clamping upper abutment in opposition to the lower abutment; said lever arm section having a T-head presenting rearwardly facing shoulders joined to the front end thereof by a shank portion extending between the arms of said front section and of a length permitting relative movement between the lever arm section and the front section and locating said shoulders for snug reception in said locking recesses for locking the tube in constricted condition between the upper and lower abutments and with the hinge connections between adjacent sections in tension and the abutment surfaces in compression, whereby forced movement of the front section rearwardly along the shank portion will release the interengagement between the shoulders and locking recesses with automatic upward movement of the lever arm section relative to the front section as a result of the stressed condition of the hinge connections and abutment surfaces to remove constriction of the tube between the upper and lower abutments and from which released position of the lever arm it may be forced downwardly to again cause interengagement between the shoulders and locking recesses for constricting the tube between the upper and lower abutments.

2. A clamp as claimed in claim 1, wherein the free ends of the arms of the front section are spaced from each other with inward projections between which the shank portion is forced for assembly of the clamp and with the projections providing a stop for the lever arm section in released position.

3. A clamp as claimed in claim 1, wherein the apical portions of the notches are rounded to provide transverse openings enhancing the spring hinge effect when the abutment surfaces are engaged.

4. A clamp as claimed in claim 3, wherein there are pairs of confronting locking recesses on the arms of the front section for selective cooperation with the said shoulders to vary the constriction of the tube between the upper and lower abutments.

5. A clamp as claimed in claim 1, wherein the aperture through the rear section is provided with flexible flap means to resiliently engage the tube for locating the clamp thereon as when the tube is in vertical disposition.

6. A clamp as claimed in claim 5, wherein the flap means comprises a pair of leaves between which the tube is engaged.

7. A clamp as claimed in claim 1, wherein the arms of the front section include upper portions inclined rearwardly with locking recesses located below the juncture between the upper and lower portions of the arms.

8. A clamp as claimed in claim 7, wherein there are provided pairs of confronting locking recesses for selective cooperation with the said shoulders to vary the constriction of the tube between the upper and lower abutments.

* * * * *